United States Patent Office 3,439,040
Patented Apr. 15, 1969

3,439,040
13-ALKYL A-NOR-3-GONENE-2-ONES
Jean Jacques, Paris, France, assignor to Merck & Co., Inc., Rahway, N.J., a corporation of New Jersey
No Drawing. Filed Oct. 21, 1965, Ser. No. 500,252
Int. Cl. C07c *169/10, 171/06, 173/00*
U.S. Cl. 260—586                                6 Claims

ABSTRACT OF THE DISCLOSURE

The invention disclosed herein relates to a new group of A-nor-3-gonenes, derivatives thereof and novel processes for preparing these compounds. In particular it relates to 13-substituted-A-nor-3-gonen-2-ones and 13-substituted-16- and 17-substituted-A-nor-3-gonen-2-ones which carry a hydroxyl together with a hydrocarbon or halogenated hydrocarbon substituent in the 16 or 17 positions. These new compounds are prepared by reducing the corresponding 13-alkyl-17β-hydroxy-4-gonen-3-one to a 5α-gonane which is acylated and oxidized to form a mixture of 2,3- and 3,4-seco decarboxylic acids; this mixture is reacted with a dehydrating agent, the resulting mixture is separated, and the resulting 13-alkyl-17β-acyloxy-A-nor-5α-gonan-2-one is dibrominated, mono-dehydrobrominated, and the residual bromine removed by hydrogenolysis, followed by hydrolysis of the 17-acyl substituent to give the Δ³-17β-hydroxy derivative; ketal protection of the 3-ketone, oxidation of the 17β-hydroxy to the 17-ketone and the reaction with an organo-metallic alkyne, haloalkyne, or haloalkene gives the presently invented 13-alkyl-17β-hydroxy-17α-(alkynyl, haloalkynyl or haloalkenyl)-A-nor-3-gonan-2-ones and corresponding 10-methyl analogs.

The compounds of this invention may be chemically represented by the following structural formula:

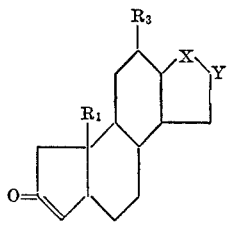

wherein one of the radicals X or Y is one of the following: (1) a hydroxymethylene radical where the hydroxy group is in the β-position; (2) an acyloxymethylene radical where the acyloxy group is in β-position; (3) an oxo radical; and (4) the radical

where one of the radicals $R_2$ and Z represents a lower aliphatic hydrocarbon substituent or a halogenated lower aliphatic hydrocarbon substituent, and the other a hydroxy or acyloxy radical; the other radical X or Y, in each case, being methylene or methylene substituted with lower alkyl or halogen, $R_1$ is hydrogen or methyl and $R_3$ is lower aliphatic hydrocarbon; and which may have additional nuclear substituents, as for example alkyl and/or halo radicals such as 1-methyl, 3-methyl, 1,3-dimethyl, 1-fluoro-3-fluoro etc., at positions 1 and/or 3.

Among the lower aliphatic hydrocarbon radicals and halogenated lower aliphatic hydrocarbon radicals which $R_2$ or Z can represent, are such lower alkynyl radicals as ethynyl, propynyl, butynyl and propargyl and their hydrogenation products such as vinyl, propenyl, allyl, butenyl, ethyl, propyl and butyl and branched chain lower aliphatic hydrocarbons, such as 1-methyl-allyl, 2-methyl-allyl and their hydrogenation products, and halo derivatives thereof such as chloroethynyl, trifluoromethylethynyl, perfluorovinyl, and the like.

The acyloxy radicals in groups $R_2$, X, Y and/or Z include alkanoyl groups such as acetyl, propionyl, butyryl, pentanoyl, hexanoyl, aroyl groups such as benzoyl, and the like.

The lower aliphatic hydrocarbon radicals at $R_3$ include lower alkyl radicals such as methyl, ethyl, n-propyl, isopropyl, n-butyl, and isobutyl.

The starting material used to prepare the product of this invention may be conveniently prepared starting with for example the corresponding 13-alkyl-17β-hydroxy-4-gonen-3-one which is reduced to the corresponding 17β-hydroxy-5α-gonan-3-one which is then acylated and treated with an oxidizing agent to give a mixture of the corresponding 2,3- and 3,4-seco dicarboxylic acid. The A ring is then closed by reacting the mixture of seco acids with a dehydrating agent. The mixture is then separated by any convenient means to give the corresponding 13-alkyl-17β-hydroxy-A-nor-5α-gonan-2-one-17β-acylate. This 13-alkyl-17β-acylate is then dibrominated and subsequently monodehydrobrominated to give the corresponding 13-alkyl-17β-acyloxy-3-bromo-A-nor-3-gonen-2-one, from which the residual bromine is removed by hydrogenolysis, preferably under Rosenmund conditions, yielding the corresponding 13-alkyl-17β-hydroxy-A-nor-3-gonen-2-one-17β-acylate which, if desired, is then hydrolyzed to remove the 17β-acyl group.

This reaction sequence is illustrated on Flow Sheet A below, wherein $R_1$ and $R_3$ are as above and Ac represents an acyl radical.

FLOW SHEET A

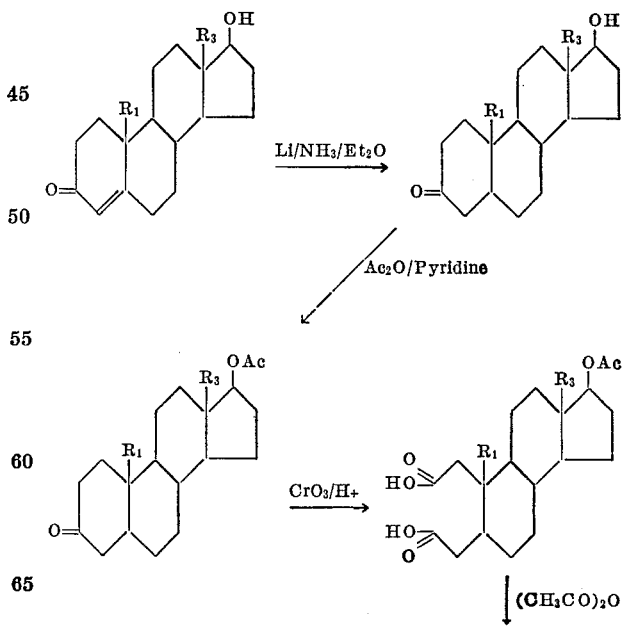

FLOW SHEET A2

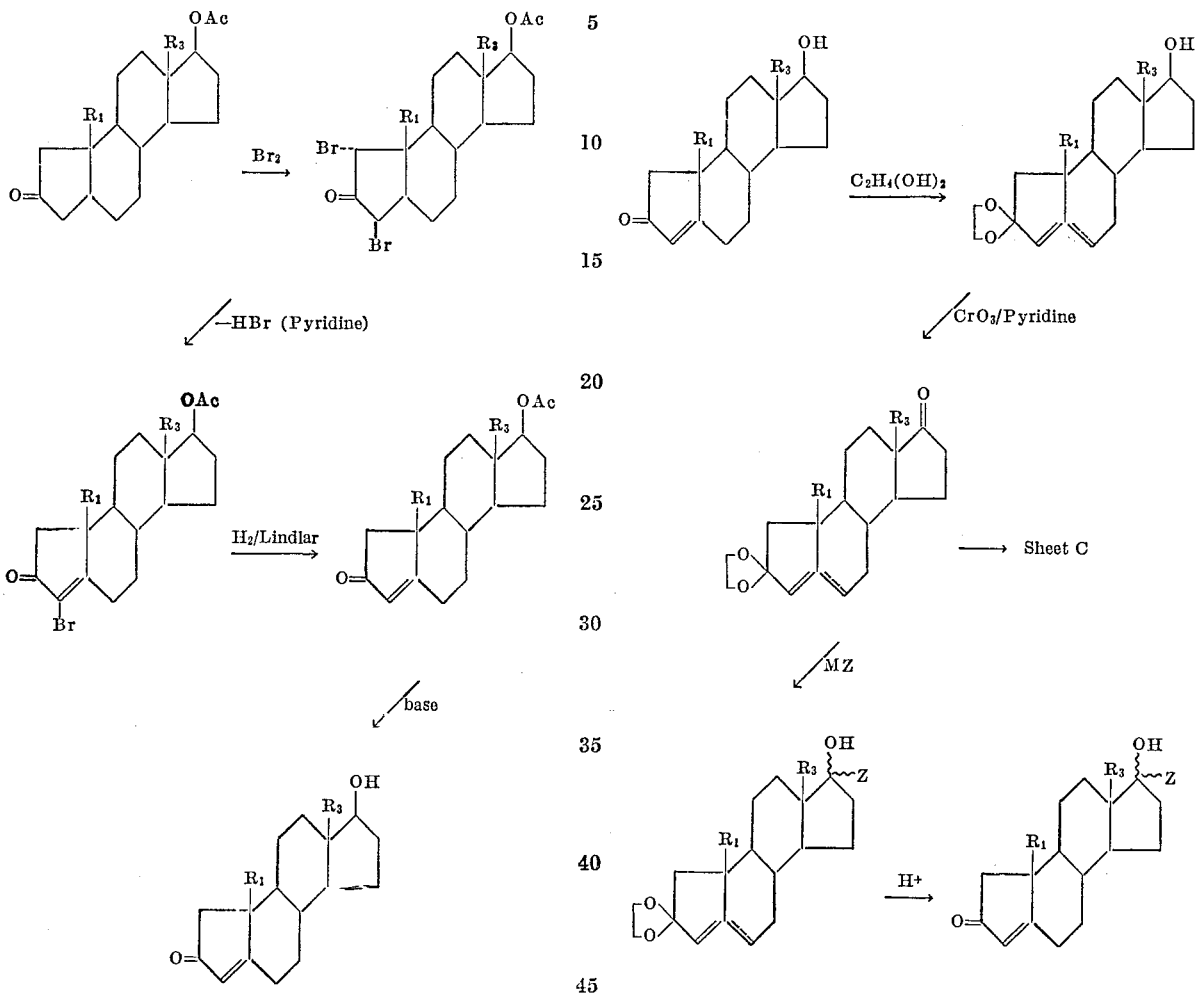

The thus produced 13α-alkyl - 17β-hydroxy-A-nor-3-gonen-2-one is then protected in the 2 position, suitably by the formation of a ketal which is then oxidized to the corresponding 17-keto-A-nor - 3-gonene - 2-ketal or the corresponding 5-gonene.

Since it is immaterial to the course of the reaction and the final products obtained by the process of this invention whether the double bond in the 2-protected steroid is in the $\Delta^3$ or $\Delta^5$ position, only the compounds wherein the double bond of such compounds is in the 3 position will be referred to below, it being understood that where the double bond is in fact in the $\Delta^5$ position, the reactions recited as well as the compounds named as containing the $\Delta^3$ double bond correspondingly occur or are formed in the $\Delta^5$ series.

The substituent group at the C-17 position is then inserted in the usual manner by reaction of the 13-alkyl-17-keto-A-nor-3-gonene-2-ketal with an organo metallic hydrocarbon or halo-substituted hydrocarbon. If desired, where the new substituent at C-17 is an acetylenic substituent, it may be reduced to the corresponding ethylenic substituent by reduction in the presence of Lindlar catalyst in the usual manner. The protecting group at C-2 is then removed by hydrolysis to give the corresponding 13-alkyl-17-substituted-17-hydroxy-A-nor-3-gonen-2-one.

This reaction sequence is illustrated on Flow Sheet B below, wherein $R_1$ and $R_3$ and Z are as above and M is a metal or halometallic group.

In a further modification of the process, the corresponding 13-alkyl - 16-substituted-16-hydroxy-A-nor - 3-gonen-2-one may be prepared. In this modification, the 13-alkyl - 17-keto-A-nor - 3-gonene-2-ketal, as prepared above, is first converted into the corresponding 13-alkyl - 17-keto - 16-hydroximino-A-nor-3-gonen-2-ketal by reaction with isoamylnitrite in the presence of a strong base. This oxime is then reacted with a mild reducing agent such as zinc in the presence of acid such as a lower alkanoic acid to produce the corresponding 17-hydroxy steroid-16-one compound which is then reacted with a suitable sulfonyl chloride to give, say, the corresponding 13-alkyl-17-tosyloxy-A-nor-3-gonene-2,16-dione. The oxygen function at 17 is then removed by means of a suitable reducing agent such as potassium borohydride or the like which will, at the same time, selectively reduce the oxygen function in the 2-position to give the 13-alkyl-2-hydroxy-A-nor-3-gonen-16-one, which may then be substituted at the 16-position in a manner similar to that employed in the substitution of the corresponding 17-keto steroid.

On completion of the substitution reaction, the 13-alkyl-16-substituted - 2,16-dihydroxy-A-nor-3-gonene is oxidized to the corresponding 13-alkyl-16-substituted-16-hydroxy-A-nor-3-gonen-2-one.

This reaction sequence is illustrated on Flow Sheet C below, wherein $R_1$ and $R_3$, M and Z are as above and Ts is the tosyl group.

FLOW SHEET C

From Sheet B
| Isoamyl nitrite

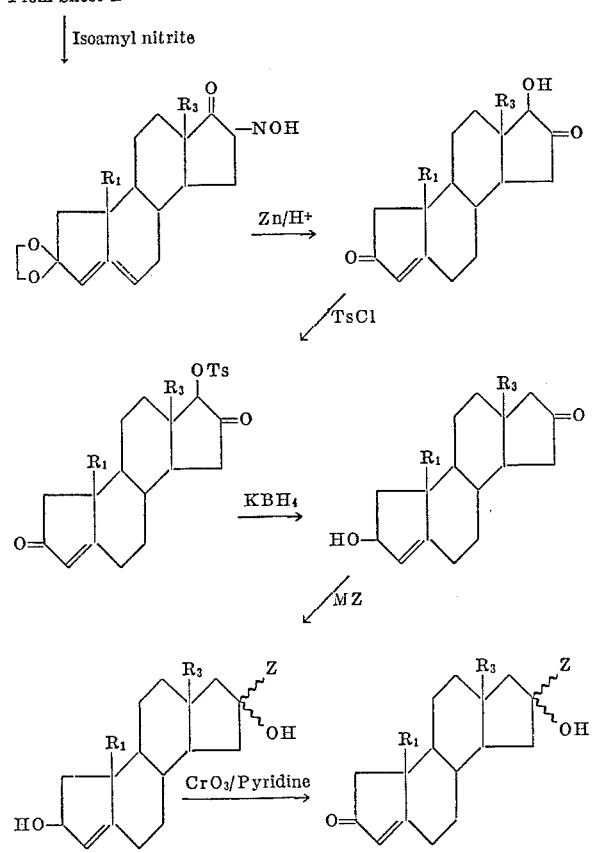

In the preferred procedure for preparing the starting material a 13-alkyl-17β-hydroxy-4-gonene-3-one such as 13-ethyl-17β-hydroxy-4-gonen-3-one is dissolved in a substantially non-polar oxygenated solvent such as an ether or tetrahydrofuran, a mixture of dioxane and diethyl ether being preferred and the solution added to a previously prepared solution of an alkali metal as lithium or potassium in previously distilled dry liquid ammonia. The mixture is agitated for from about 5 to about 30 minutes and an axcess of dry crystalline ammonium salt, ammonium chloride being especially suitable, is added, and the mixture agitated under a stream of inert gas, for example under a stream of nitrogen, for from about 8 to about 18 hours and from about 15° to about 30° C. Water is then added to the residue which is extracted with a suitable water immiscible organic solvent such as ethyl acetate or diethyl ether. The organic extract is then separated, washed with a mildly acidic aquous solution, sodium bicarbonate being suitable, dried over a drying agent such as sodium sulfate, filtered and the solvent removed to give the desired 13-alkyl-17β-hydroxy-5α-gonan-3-one such as 13-ethyl-17β-hydroxy-5α-gonan-3-one or 17β-hydroxy-5α-androstan-3-one.

The 13-alkyl-17β-hydroxy-gonan-3-one is dissolved in a suitable base, an organic base such as pyridine being preferred and the solution cooled. An acylating agent, for example, a carboxylic acid chloride such as acetyl chloride, propionyl chloride, cyclohexyl carboxylic acid chloride or benzyl chloride is added slowly, the temperature being maintained from about 0° C. to about 5° C. The mixture is then stirred at the same temperature range for from about 15 to about 60 minutes and allowed to stand at that temperature for a further period of from about 8 to about 18 hours. The mixture is then poured over a stirred mixture of ice and water and agitated for a further period of from 30 to 60 minutes at a temperature at from about 5° C. to about 30° C., filtered, and the residue washed with water and dried in air to give the corresponding 13-alkyl-17β-hydroxy-5α-gonan-3-one-17β-acylate or 17β-hydroxy-5α-androstan-3-one-17β-acylate.

The 13-alkyl-17β-hydroxy-5α-gonan-3-one-17β-acylate, for example, 13-propyl-17β-hydroxy-5α-gonan-3-one-17β-cyclohexyl carboxylate, 13-methyl-17β-hydroxy-5α-gonan-3-one-17β-benzoate or 17β-hydroxy-5α-androstan-3-one-17β-acetate is dissolved in an organic acid, a lower alkanoic acid, such as glacial acetic acid being especially suitable and the mixture warmed to from about 40° to about 60° C. An oxidizing agent such as chromium trioxide dissolved in a mixture of water and the previously mentioned organic acid is added to the solution of the steroid over a period of from about 1 to about 3 hours, the temperature being maintained in the range of from about 40° to about 70° C. This temperature is maintained for a further period of from about 2 to about 5 hours and the mixture concentrated by partial evaporation, preferably in vacuo. The concentrate is suspended in dilute aqueous mineral acid, such as aqueous sulfuric acid, and the mixture agitated for from about 15 to about 60 minutes. The aqueous solution is extracted with a suitable water immiscible organic solvent, an oxygenated solvent such as ethyl acetate or ether being preferred, the extract is washed with dilute aqueous base, dried over a drying agent, filtered, and the filtrate evaporated to dryness preferably in vacuo. The alkaline aqueous phase is poured into an excess of cold dilute mineral acid, a 20% solution of sulfuric acid being preferred, extracted with a water immiscible solvent, such as a halogenated hydrocarbon solvent, for example chloroform or methylene chloride, or the like, and the organic extract washed with dilute aqueous mineral acid, dried over a drying agent, and filtered, the solvent removed from the filtrate, suitably by evaporation to give a mixture of the corresponding 13-alkyl-17β - hydroxy - 2,3 - seco - 5α - gonan - 17β - acyloxy - 2, 3-dicarboxylic acid and 13-alkyl-17β-hydroxy-3,4-seco-5α-gonan-17β-acyloxy-3,4-dicarboxylic acid.

The mixture of 2,3-seco and 3,4-seco dicarboxylic acids is treated with a dehydrating agent, suitably, the acids are dissolved in the dehydrating agent, for example a lower alkanoic anhydride such as acetic anhydride, and heated vigorously preferably under reflux, for from about 1 to about 3 hours. The mixture is then cooled, and a small amount of the corresponding alkali metal salt, for example sodium acetate is added, and the mixture similarly heated for a further 1 to about 3 hours. The mixture is allowed to stand at from about 15° to about 30° C. for from about 8 to about 18 hours, filtered, and the solvent partially removed from the filtrate by evaporation, preferably under reduced pressure. The residual concentrate is poured over a mixture of ice and weak aqueous base, for example aqueous sodium bicarbonate solution, and extracted with a water immiscible organic solvent, an oxygenated solvent, such as ether, or a halogenated hydrocarbon solvent such as chloroform or methylene chloride being especially suitable. The extract is then further washed with dilute weak base and dried over a drying agent to give a mixture of the corresponding 13-alkyl-17β-hydroxy-A-nor-5α-gonan-2-one-17β-acylate and 13-alkyl-17β-hydroxy-A-nor-5α-gonan-3-one-17β-acylate.

The mixture thus produced is then separated, preferably by chromatography on alumina, to give the corresponding 13-alkyl-17β-hydroxy-A-nor-5α-gonan-2-one-17β-acylate.

The 13α-alkyl-17β-hydroxy-A-nor-5α-gonane-2-one-17β-acylate, such as, 13-ethyl-17β-hydroxy-A-nor-5α-gonan-2-one-17β-cyclohexylcarboxylate, 13-isobutyl-17β-hydroxy-A-nor-5α-gonan-2-one-17α-benzoate or 17β-hydroxy-A-nor-5α-androstan-2-one-17β-acetate or the like, is dissolved in a lower alkanoic acid, such as, glacial acetic acid, it being preferable to use the acid corresponding to the acyl group at the 17β position; however, where this is not practical, glacial acetic acid is the preferred medium. Bromine dissolved in the same solvent is then added and the mixture allowed to stand for from about 30 hours to about 90 hours at from about 5° C. to about 30° C. The product, the corresponding 13-alkyl-17β-acyloxy-1α,3β-dibromo-A-nor-5α-gonan-2-one is then isolated. In the preferred procedure, water is added to the reaction mixture and the precipitate yielded thereby is removed by filtration, washed and dried and, if desired, further purified by recrystallization, a lower alkanol such as 95% ethanol, methanol or isopropanol being preferred.

The 13-alkyl-17β-acyloxy-1α,3β-dibromo - A - nor - 5α-gonan-2-one, such as 13-ethyl-17β-acetoxy-1α,3β-dibromo-5α-gonan-2-one, 13α-methyl-17β-benzoyloxy-1α,3β-dibromo-A-nor-5α-gonane-2-one or 17β-acetoxy-1α,3β-dibromo-A-nor-5α-androstan-2-one is then reacted with a moderately strong dehydrobrominating agent an organic base such as collidine or pyridine being preferred. The monodehydrobromination is affected by heating the steroid in a solution of, or containing the dehydrobrominating agent, preferably under reflux, for from about 5 to about 30 minutes. The product, such as 13-ethyl-17β-acetoxy-3-bromo-A-nor-3-gonen-2-one, 13-methyl - 17β - benzoyloxy-3-bromo-A-nor-3-gonen-2-one, or 17β-acetoxy-3-bromo-A-nor-3-androsten-2-one is then isolated. In the preferred procedure, the reaction mixture is cooled and extracted with an organic, water immiscible solvent, ether, ethyl acetate or benzene being preferred and the organic extract washed with water, dried and the solvent removed suitably by evaporation under reduced pressure and if desired, the residue further purified by recrystallization, a lower alkanol such as methanol or ethanol being especially preferred.

The 13-alkyl - 17β - acyloxy-3-bromo-A-nor-3-gonen-2-one, such as, 13-isopropyl-17β-cyclohexyl carboxy-3-bromo-A-nor-3-gonen-2-one or 13-ethyl - 17β - valeryloxy-3-bromo-A-nor-3-gonen-2-one or 17β-acetoxy-3-bromo-A-nor-3-androsten-2-one is subjected to hydrogenolysis. It is preferred to carry out this reaction under Rosenmund conditions. In this procedure, the steroid is dissolved in an organic solvent, a moderately high boiling aromatic solvent, such as benzene or xylene being preferred and a partially poisoned hydrogenation catalyst added thereto. It is preferred to use the Lindlar catalyst which consists of palladium deposited on barium sulfate in the presence of quinoline. However, any hydrogenation catalyst which will not effect the hydrogenation of a double bond may be used. Suitably the apparatus is purged with hydrogen for a period of from about 5 to about 30 minutes and hydrogen passed into the reaction mixture. It is preferred to agitate the mixture and heat it to the boiling point of the solvent for a period of from about 25 to about 50 hours, after which the monodehydrobrominated product, that is to say, the corresponding 13-alkyl-17β-acyloxy-A-nor-3-gonene-2-one is isolated. In the preferred procedure, the solvent is removed by evaporation under reduced pressure and the residue filtered on a column of alumina. Any of the commonly used eluents employed with alumina may be used; however, petroleum ether and a mixture of ether and petroleum ether have been found especially suitable, to yield, on evaporation of the solvent, the desired product in purified form as a residue.

If desired, the 13-alkyl-17β-hydroxy-A-nor-3-gonen-2-one-17β-acylate, such as 13-ethyl-17β-hydroxy-A-nor-3-gonen-2-one-17β-cyclohexyl carboxylate, or 13-isobutyl-17β-hydroxy-A-nor-3-gonen-2-one - 17α - benzoate is dissolved in a polar solvent suitably a lower alkanol such as methanol and a strong base, preferably an inorganic base such as sodium or potassium hydroxide in water, is added, and the mixture vigorously heated, preferably under reflux, in an inert atmosphere, for from about 1 to about 4 hours. The mixture is cooled to a temperature of from about 0° C. to about 10° C. and a very large excess of water is added very very slowly, care being taken to maintain the temperature in the same range. The mixture is then kept at a temperature of from between 0° C. to about 5° C. for from about 8 to 18 hours, and filtered, to give the corresponding 13-alkyl-17β-hydroxy-A-nor-3-gonen-2-one.

Compounds which may be produced by the above procedure and are useful as starting materials for the production of the product of this invention include 13-n-propyl-17β-hydroxy-A-nor-3-gonen-2-one, 13-ethyl - 17β-hydroxy-A-nor-3-gonen-2-one, 13-n-butyl-17β-hydroxy-A-nor-3-gonen-2-one, 13 - iso - propyl - 17β - hydroxy - A-nor-3-gonen-2-one, 13-iso-butyl - 17β - hydroxy-A-nor-3-gonen-2-one, and 17β-hydroxy-A-nor-3-androsten-2-one.

The 13-substituted-17-substituted-17-hydroxy-A-nor-3-gonen-2-one is then prepared. In the preferred method, a 13-substituted-17β-hydroxy-A-nor-3-gonen-2-one, for example, a 13-alkyl-17β-hydroxy-A-nor-3-gonen-2-one such as, 13-ethyl-17β-hydroxy-A-nor-3-gonen-2-one is protected to the 2 position suitably by formation of a ketal. For example, a 2-dioxolane may be formed by treatment of the steroid with an alkylene glycol such as ethylene glycol in a reaction inert hydrocarbon solvent which forms an azeotropic mixture with water, a solvent having a boiling point above 100° C. such as toluene or xylene being preferred, in the presence of an acidic catalyst, suitably p-toluene sulfonic acid. The reaction mixture is heated to the boiling point of the solvent for a period of from about 5 to about 8 days, during which time the water-solvent azeotrope is removed in the usual manner and the solvent thus removed replaced with dry solvent. The product is then isolated. Suitably the mixture is cooled and neutralized with a weak base, an aqueous solution of an alkali metal carbonate, such as potassium carbonate being preferred. The organic layer separated, washed with water, and evaporated, suitably under reduced pressure to yield the 13-substituted-17β-hydroxy-A-nor-3-gonene-2-ketal such as the 13-ethyl-17β-hydroxy-A-nor-3-gonene-2-dioxolane, or 17β-hydroxy-A-nor-3-androstene-2-dioxolane.

The 17-hydroxy-steroid-dioxolane is then oxidized to the corresponding 17-keto-steroid-dioxolane. This may be done by treatment with an oxidizing agent, preferably chromium trioxide in an organic base, such as pyridine, and the mixture stirred at a temperature of from about 10° C. to about 30° C. for from about 30 minutes to 100 minutes, and left to stand at this temperature for from about 8 hours to about 18 hours and the product isolated therefrom. In the prefered method of isolation, a coagulating adsorbent such as a powdered asbestos, suitably Celite is added and the mixture filtered under suction. The filtrate is diluted with water and the 17-keto-steroid, such as 13-ethyl-17-oxo-A-nor-3-gonene-2-dioxolane is precipitated and isolated by filtration.

The substituent group at C–17 is then inserted by reaction of the 13-alkyl-17-keto-A-nor-3-gonene-2-ketal with an organo metallic hydrocarbon, such as an alkali metal hydrocarbon such as lithium butyl, lithium acetylide, or sodium chloroacetylide, or a hydrocarbon Grignard reagent such as propyl magnesium bromide or iodide, or trifluoromethylvinyl magnesium bromide.

In a preferred procedure, the alkali metal acetylide, for example, potassium acetylide is formed by reacting acetylene with an alkali metal alcoholate formed by reaction between the alkali metal and a lower alkanol in an inert organic solvent. The steroid substrate is an inert organic solvent, such as ether, is added to the alkali metal acetylide mixture. The reaction is carried out at a temperature from about 0° to about 30° C. The time of reaction is not critical, but best yields are obtained during a period of from about 4 to about 8 hours. Better yields may often be obtained by passing acetylene through the mixture during the reaction period although this is not essential.

Reaction of the starting compound with an organometallic haloalkyne forms the corresponding 17-haloalkyne. An organometallic chloroethyne is formed, for example, by the addition of 1,2-dichloroethylene in an inert organic solvent such as ether to a mixture of alkali metal amide in liquid ammonia. The mixture is initially maintained at a low temperature, for example, −40° to −50° C. and is thereafter refluxed for a short period, for example, from about 15 to about 45 minutes. A solution of the steroid substrate in an inert organic solvent such as ether is added while refluxing continues and the reflux period is extended another 15 to 30 minutes. An inert atmosphere may be used to aid in minimizing side reactions but is not essential.

A butynyl group is introduced at the 17-position by reaction of the starting compound with lithium butyne-1 which is formed by reaction of butyne-1 with butyl lithium. In a preferred modification, the lithium metal is reacted with butyl bromide in an inert organic solvent at a low temperature, for example, at about $-10°$ C. The butyne-1 in ether or other inert organic solvent is then added and the mixture stirred at from about $-5°$ C. to about $5°$ C. for from 1 to 2 hours. At the end of this period, the steroid substrate in an inert organic solvent such as tetrahydrofuran is added and the mixture warmed at from about $40°$ to about $60°$ C. for from 2 to 6 hours.

The above described reactions with organometallic compounds produce both alpha and beta epimers. These may be separated and isolated, for example, by chromatography.

Reduction of the alkynyl substituted compound to produce the alkenyl substituted compounds of this invention may be effected by catalytic hydrogenation preferably with a poisoned catalyst such as Lindlar catalyst. For example, the steroid alkyne may be added to a suspension of palladium on carbon in an inert organic solvent such as a lower alkanol, more specifically, ethanol, or propanol. Hydrogen is then passed through the mixture at room temperature until the desired amount is absorbed, one molar equivalent being absorbed in the preparation of alkenyl compounds.

The thus obtained 13-alkyl-17-substituted 17-hydroxy-A-nor-3-gonene-2-ketal such as 13-ethyl-17α-ethynyl-17β-hydroxy-A-nor-3-gonene-2-dioxolane or 17α-ethynyl-17β-hydroxy-A-nor-3-androstene - 2 - dioxolane is then converted to the corresponding 2-keto-steroid by hydrolysis, suitably the ketal is dissolved in a water immiscible organic solvent such as a lower alkanol, preferably methanol or ethanol and a small amount of strong acid such as p-toluene, sulfonic acid or concentrated hydrochloric acid is added thereto and the mixture heated to the boiling point of the solvent in an inert atmosphere, suitably a nitrogen atmosphere, for from about 30 minutes to about 100 minutes and the product isolated. In one isolation procedure, the reaction mixture is cooled and neutralized with a mild base, an alkali metal carbonate or bicarbonate, such as sodium carbonate and the mixture evaporated to dryness under reduced pressure. The residue is then dissolved in a water immiscible organic solvent, a halogenated hydrocarbon, such as chloroform or methylene chloride being especially suitable and the solution washed with water, dried over a drying agent, such as sodium sulfate, and the organic extract evaporated under reduced pressure to give the 13-alkyl-17-substituted-17-hydroxy-A-nor-3-gonen - 2 - one, such as 13 - ethyl - 17α-ethynyl-17β-hydroxy-A-nor-3-gonen-2-one or 17α-ethynyl-17β-hydroxy-A-nor-3-androsten-2-one.

In a further modification of the process, the 13-substituted-16-substituted-16 - hydroxy-A-nor-3-gonen-2-one may be prepared. In this modification of the process, the 13-substituted-17-keto-A-nor-3-gonene - 2 - ketal as prepared above is first converted to the corresponding 13-alkyl-17-keto-16-hydroximino-A-nor - 3 - gonene-2-ketal, suitably a solution of an alkali metal in a lower alkanol suitably potassium t-butanol is prepared and the 17-keto steroid 2-dioxolane is added thereto and the mixture stirred at a temperature from between $15°$ C. and $30°$ C. Freshly distilled isoamyl nitrite is added dropwise and the reaction mixture stirred at the same temperature for a further 8 to 18 hours. The reaction mixture is then diluted with water and extracted with a water immiscible solvent, suitably ether or ethyl acetate, the aqueous phase separated from the organic phase and the former carefully acidified to give, as a precipitate, the corresponding 16-oxime, for example, the 13-alkyl-2-ethylenedioxy-A-nor-3-gonen-17-one 16-oxime.

The oxime is then reduced with a mild reducing agent, zinc in dilute alkanoic acid, suitably acetic acid being preferred. The mixture is heated under reflux for from 1–3 hours and the product is isolated. In the preferred mode of isolation the reaction mixture is evaporated almost to dryness suitably under reduced pressure, the residue taken up in water and crystallized therefrom to give the 2,16-dioxo-17-hydroxy steroid, for example, 17-hydroxy-13-alkyl-2,16-dioxo-A-nor-3-gonene.

This 17-hydroxy-2,16-dioxo steroid is then protected at the 17-position, protection with a mesyl or tosyl group being suitable. The protection being achieved by reaction of the steroid with a suitable acid chloride such as p-toluene sulfonyl chloride or methane sulfonyl chloride in pyridine at a temperature of from about $15°$ to about $30°$ C. The product is isolated in the usual manner.

The oxygen function at C–17 is then removed by reduction. This may be effected by treating the 2,16-dioxo-17-protected steroid such as the 13-alkyl-2,16-dioxo-A-nor-3-gonene-17-tosylate with a reducing agent, such as an alkali metal borohydride in the presence of lower alkanol and an organic base, potassium borohydride in the presence of isopropanol and pyridine being especially suitable. It is preferred to carry out the reaction by stirring the mixture at a temperature of between about $15°$ and about $30°$ C. for from about 1 to about 4 hours. The reaction mixture is then cooled and acidified suitably by the addition of a mineral acid such as concentrated hydrochloric acid mixed with ice, and the acidified reaction mixture diluted with water and extracted with a water immiscible solvent such as ether or ethyl acetate. The organic extract dried over a suitable drying agent such as sodium sulfate filtered and evaporated under reduced pressure to give the corresponding 2-16-dioxo-steroid such as the 13-alkyl-2,16-dioxo-A-nor-3-gonene, however where the reaction is carried out in the presence of iso-propanol; the 2-oxo group is reduced as well to yield the 13-alkyl-2-hydroxy-A-nor-3-gonen-16-one.

The thus produced 16-keto steroid is reacted with an organo metallic hydrocarbon such as an alkyl, alkenyl, or alkynyl magnesium halide or lithium salt, or the halogenated hydrocarbon analog thereof in a manner similar to that utilized for the corresponding 17-oxo compound described above. In a similar manner, the product of this reaction is oxidized to the corresponding 2-oxo-16-substituted steroid by reaction with an oxidizing agent, suitably chromium trioxide in pyridine.

Among the suitable substituent groups at C–16 (including the C–16 carbon atom) are alkylene hydroxymethylene, chloroethynylhydroxymethylene, trifluorovinylhydroxymethylene and trifluoromethylethynylhydroxymethylene.

Among the compounds which may be produced in accordance with the process of this invention are:

13-ethyl-17-ethynyl-17-hydroxy-A-nor-3-gonen-2-one,
13-ethyl-17-vinyl-17-hydroxy-A-nor-3-gonen-2-one,
13-ethyl-17-ethyl-17-hydroxy-A-nor-3-gonen-2-one,
13-ethyl-17-propyl-17-hydroxy-A-nor-3-gonen-2-one,
13-ethyl-17-butyl-17-hydroxy-A-nor-3-gonen-2-one,
13-ethyl-17-trifluorovinyl-17-hydroxy-A-nor-3-gonen-2-one,
13-ethyl-17-trifluoromethylvinyl-17-hydroxy-A-nor-3-gonen-2-one,
13-ethyl-17-trifluoromethylethynyl-17-hydroxy-A-nor-3-gonen-2-one,
13-ethyl-17-bromoethynyl-17-hydroxy-A-nor-3-gonen-2-one,
13-ethyl-17-chloroethynyl-17-hydroxy-A-nor-3-gonen-2-one,
17-ethynyl-17-hydroxy-A-nor-3-androsten-2-one,
17-vinyl-17-hydroxy-A-nor-3-androsten-2-one, 17-ethyl-17-hydroxy-A-nor-3-androsten-2-one,
17-propyl-17-hydroxy-A-nor-3-androsten-2-one,
17-butyl-17hydroxy-A-nor-3-androsten-2-one,
17-trifluorovinyl-17-hydroxy-A-nor-3-androsten-2-one,
17-trifluoromethylvinyl-17-hydroxy-A-nor-3-androsten-2-one,
17-trifluoromethylethynyl-17-hydroxy-A-nor-3-androsten-2-one,
17-bromoethynyl-17-hydroxy-A-nor-3-androsten-2-one,
17-chloroethynyl-17-hydroxy-A-nor-3-androsten-2-one,
13-ethyl-16-ethyl-16-hydroxy-A-nor-3-gonen-2-one,
13-ethyl-16-vinyl-16-hydroxy-A-nor-3-gonen-2-one,
13-ethyl-16-ethyl-16-hydroxy-A-nor-3-gonen-2-one,
13-ethyl-16-propyl-16-hydroxy-A-nor-3-gonen-2-one,
13-ethyl-16-butyl-16-hydroxy-A-nor-3-gonen-2-one,
13-ethyl-16-trifluorovinyl-16-hydroxy-A-nor-3-gonen-2-one,
13-ethyl-16-trifluoromethylvinyl-16-hydroxy-A-nor-3-gonen-2-one,
13-ethyl-16-trifluoromethylethynyl-16-hydroxy-A-nor-3-gonen-2-one,
13-ethyl-16-bromoethynyl-16-hydroxy-A-nor-3-gonen-2-one,
13-ethyl-16-chloroethynyl-16-hydroxy-A-nor-3-gonen-2-one,
13-propyl-17-ethynyl-17-hydroxy-A-nor-3-gonen-2-one,
13-isopropyl-17-vinyl-17-hydroxy-A-nor-3-gonen-2-one,
13-butyl-17-ethyl-17-hydroxy-A-nor-3-gonen-2-one,
13-isobutyl-17-propyl-17-hydroxy-A-nor-3-gonen-2-one,
13-methyl-17-butyl-17-hydroxy-A-nor-3-gonen-2-one,
13-propyl-17-trifluorovinyl-17-hydroxy-A-nor-3-gonen-2-one,
13-isopropyl-17-trifluoromethylvinyl-17-hydroxy-A-nor-3-gonen-2-one,
13-butyl-17-trifluoromethyl-ethynyl-17-hydroxy-A-nor-3-gonen-2-one,
13-isobutyl-17-bromoethylnyl-17-hydroxy-A-nor-3-gonen-2-one,
13-methyl-17-chloroethylnyl-17-hydroxy-A-nor-3-gonen-2-one,
13-propyl-16-ethynyl-16-hydroxy-A-nor-3-gonen-2-one,
13-isopropyl-16-vinyl-16-hydroxy-A-nor-3-gonen 2-one,
13-butyl-16-ethyl-16-hydroxy-A-nor-3-gonen-2-one,
13-isobutyl-16-propyl-16-hydroxy-A-nor-3-gonen-2-one,
13-methyl-16-butyl-16-hydroxy-A-nor-3-gonen-2-one,
13-propyl-16-trifluorovinyl-16-hydroxy-A-nor-3-gonen-2-one,
13-isopropyl-16-trifluoromethylvinyl-16-hydroxy-A-nor-3-gonen-2-one,
13-butyl-16-trifluoromethylethylnyl-16-hydroxy-A-nor-3-gonen-2-one,
13-isobutyl-16-bromoethynyl-16-hydroxy-A-nor-3-gonen-2-one,
13-methyl-16-chloroethynyl-16-hydroxy-A-nor-3-gonen-2-one,
16-ethynyl-16-hydroxy-A-nor-3-androsten-2-one,
16-vinyl-16-hydroxy-A-nor-3-androsten-2-one,
16-ethyl-16-hydroxy-A-nor-3-androsten-2-one,
16-propyl-16-hydroxy-A-nor-3-androsten-2-one,
16-butyl-16-hydroxy-A-nor-3-androsten-2-one,
16-trifluorovinyl-16-hydroxy-A-nor-3-androsten-2-one,
16-trifluoromethylvinyl-16-hydroxy-A-nor-3-androsten-2-one,
16-trifluoromethylethynyl-16-hydroxy-A-nor-3-androsten-2-one,
16-bromoethynyl-16-hydroxy-A-nor-3-androsten-2-one,
16-chloroethynyl-16-hydroxy-A-nor-3-androsten-2-one.

Esters are prepared by reaction between the steroid substrate and the selected acylating agent, for example, an alkanoic acid anhydride or alkanoyl halide in the presence of tertiary amine such as pyridine. It is convenient to take up the steroid and acylating agent in pyridine or other liquid tertiary amine and to allow the mixture to stand at room temperature for an extended period of time, for example, from about 16 to about 24 hours. Alternatively, the reaction rate can be increased by refluxing the mixture for a peroid of from about 3 to about 8 hours. Temperature and time of reaction are not critical.

The compounds of this invention have valuable pharmacological properties. They are potent inhibitors of progesterone as demonstrated by their inhibition of the effect of progesterone in the endometrium of the rabbit. Their anti-estrogenic effect is much weaker.

The following examples described in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, relative amounts of materials are given in parts by weight, except as otherwise noted.

EXAMPLE 1

13$\beta$-ethyl-3-methoxy-2,5(10)-gonadiene-17$\beta$-ol, methanol 28.3 g. is stirred in methanol, 504 ml. containing 11-N-hydrochloric acid, 34 ml. and water, 22 ml. until completely dissolved. The solution is kept at 18° C. for 2 hours, then poured into brine, and extracted with chloroform, and the solvent removed by evaporation, leaving as the residue 13$\beta$-ethyl-17$\beta$-hydroxy-4-gonen-3-one, which may be recrystallized from ethyl acetate.

In accordance with the above procedure but starting with 13-methyl, 13-n-propyl, 13-n-butyl, 13-isopropyl, and 13-isobutyl-3-methoxy-2,5(10)-gonadiene-17$\beta$-ol in place of 13-ethyl-3-methoxy-2,5(10)-gonadiene-17$\beta$-ol there is obtained the corresponding 13-methyl, 13-n-propyl, 13-n-butyl, 13-isopropyl, and 13-isobutyl 17$\beta$-hydroxy-4-gonen-3-one.

EXAMPLE 2

13$\beta$-ethyl-17$\beta$-hydroxy-4-gonen-3-one, 12 grams is dissolved in dry dioxane, 100 ml., and 100 ml. of dry ether and the solution added to 1.2 grams of lithium dissolved in previously distilled dry liquid ammonia. After 15 minutes, 60 grams of dry crystalline ammonium chloride is added and the mixture agitated under a stream of nitrogen for 12 hours at 18° C. Water is added to the residue and the mixture extracted with ether. The ether extract is washed with a saturated solution of aqueous sodium bicarbonate, dried over sodium sulfate, filtered, and the solvent removed by evaporation to give 13-ethyl-17$\beta$-hydroxy-5$\alpha$-gonan-3-one.

In accordance with the above procedure but starting with 13-methyl, 13-n-propyl, 13-n-butyl, 13-isopropyl, and 13-isobutyl-17$\beta$-hydroxy-4-gonen-3-one in place of 13-ethyl-17$\beta$-hydroxy-4-gonen-3-one there is obtained the corresponding 13-methyl, 13-n-propyl, 13-n-butyl, 13-isopropyl and 13-isobutyl-17$\beta$-hydroxy-5$\alpha$-gonan-3-one.

EXAMPLE 3

5.6 grams of 13-ethyl-17$\beta$-hydroxy-5$\alpha$-gonan-3-one is dissolved in 40 ml. of dry pyridine and the solution cooled in an ice bath. 3.4 grams of cyclohexane carboxylic acid chloride are added slowly, the temperature being maintained between 0° and 5° C. The mixture is then stirred at the same temperature for 30 minutes and left to stand at that temperature for a further 12 hours. The mixture is then poured over a stirred mixture of ice and water, the mixture stirred for a further 40 minutes at a temperature of between 5° C. and 30° C., filtered, washed with water, and dried in air to give 13-ethyl-17$\beta$-hydroxy-5$\alpha$-gonan-3-one-17$\beta$-cyclohexyl carboxylate. The product is used in the next stage of the process without further purification.

In accordance with the above procedure but starting with 13-methyl, 13-n-propyl, 13-n-butyl, 13-isopropyl and 13-isobutyl-17$\beta$-hydroxy-5$\alpha$-gonan-3-one in place of 13- ethyl-17β-hydroxy-5α-gonan-3-one there is obtained the corresponding 13-methyl, 13-n-propyl, 13-n-butyl, 13-isopropyl and 13-isobutyl-17β-hydroxy-5α-gonan-3-one-17β-cyclohexyl carboxylate.

In accordance with the above procedure and starting with any of the above-named steroids of the gonane series but using acetyl chloride, propionyl chloride, butyryl chloride, valeryl chloride and benzoyl chloride in place of cyclohexyl carboxylic acid chloride there is obtained the corresponding 17α-acetate, 17α-propionate, 17β-valerate, 17β-butyrate and 17β-benzoate of these steroids of the gonane series.

EXAMPLE 4

6.57 grams of 13-ethyl-17β-hydroxy-5α-gonan-3-one 17β-cyclohexyl carboxylate are dissolved in 42 ml. of glacial acetic acid and the mixture warmed to 55° C. 4.95 grams of chromium trioxide are dissolved in a mixture of 5 ml. of water and 37 ml. of glacial acetic acid, this solution is added to the solution of the steroid over a period of 2 hours the temperature being maintained in the range of 55° to 65° C. The mixture is maintained at this temperature for 3 hours, and concentrated in vacuo, the residue is taken up in 80 ml. of 5% aqueous sulfuric acid, stirred for 30 minutes, and extracted several times with ethyl acetate, the extract is washed several times with 5% aquous sodium carbonate, dried over sodium sulfate, and evaporated to dryness. The alkaline aqueous phase is poured into excess cold aqueous 20% solution of sulfuric acid, extracted with chloroform and the chloroform extract washed thoroughly with dilute aqueous sulfuric acid and saturated aqueous sodium chloride solution. The chloroform extract is dried over sodium sulfate and the solvent removed by evaporation. The residues are combined to give a mixture of 13-ethyl-17β-hydroxy-2,3 - seco - 5α-gonane 17β-cyclohexyl carboxylate-2,3-dicarboxylic acid and 13-ethyl-17β-hydroxy-3,4-seco-5α-gonane-17β - cyclohexyl carboxylate-3,4-dicarboxylic acid.

In accordance with the above procedure but starting with 13-methyl, 13-n-propyl, 13-n-butyl, 13-isopropyl and 13-isobutyl-17β-hydroxy-5α-gonan-3-one-17β - cyclohexyl carboxylate in place of 13-ethyl-17β-hydroxy-5α-gonan-3-one-17β-cyclohexyl carboxylate there is obtained the corresponding mixture of 13-methyl, 13-n-propyl, 13-n-butyl, 13-isopropyl and 13-isobutyl-2,3-seco and 3,4-seco-5α-gonane-17β-cyclohexyl carboxylate-2,3- and 3,4-dicarboxylic acids.

In accordance with the above procedure and using any of the aforementioned 13-substituted steroids of the gonane series, except that the acyl group at 17β is acetoxy, propionoxy, butyroxy, valeroxy, or benzoyloxy in place of cyclohexyl carboxy there is obtained the corresponding mixture of 2,3- and 3,4-seco dicarboxylic acids.

EXAMPLE 5

5.81 grams of a mixture comprising 13-ethyl-17β-hydroxy-2,3-seco-5α-gonane-17β-cyclohexyl carboxylate and 13-ethyl-17β-hydroxy-3,4-seco-5α-gonane - 17β-cyclohexyl carboxylate-3,4-dicarboxylic acid is dissolved in 53 ml. of acetic anhydride and heated under vigorous reflux for 2 hours. The mixture was cooled and 2.9 grams of anhydrous sodium acetate added, and the mixture heated under reflux for a further 3 hours. The mixture was allowed to stand at 18° C. for 12 hours, filtered, and the solvent partially removed by evaporation in vacuo. The residual concentrate is poured over a mixture of ice and aqueous sodium bicarbonate solution, allowed to stand for 1 hour, and extracted with ether. The ether extract is washed with aqueous sodium bicarbonate, water, dried over sodium sulfate and filtered. The solvent is removed from the filtrate by evaporation under reduced pressure to give a mixture of 13 - ethyl-17β-hydroxy-A-nor-5α-gonan-2-one 17β-cyclohexyl carboxylate and 13-ethyl-17β-hydroxy-A-nor-5α-gonan-3-one-17β-cyclohexyl carboxylate.

In accordance with the above procedure but starting with the corresponding 13-methyl, 13-n-propyl, 13-n-butyl, 13-isopropyl and 13-isobutyl-2,3- and 3,4-seco-dicarboxylic acids in place of the mixture of 13-ethyl-17β-hydroxy-2,3-seco and 3,4-seco-5α-gonane-17β-cyclohexyl carboxylate 2,3- and 3,4-dicarboxylic acid there is obtained the corresponding mixture of 13-methyl, 13-n-propyl, 13-n-butyl, 13-isopropyl and 13-isobutyl-17β - hydroxy - A-nor - 5α-gonan-2-one and 3-ones.

In accordance with the above procedure and using the aforementioned mixtures of 2,3- and 3,4-seco dicarboxylic acids except that the substituent at 17β is 17β-acetoxy, 17β-propionoxy, 17β-butyroxy, 17β-valeroxy, and 17β-benzoyloxy, in place of 17β-cyclohexyl carboxy, there are obtained the corresponding 2,3- and 3,4-seco-dicarboxylic acid.

EXAMPLE 6

The mixture of 13-ethyl-17β-hydroxy-A-nor-5α-gonan-2-one - 17β - cyclohexyl carboxylate and 13-ethyl-17β-hydroxy-A-nor-5α-gonan-3-one-17β - cyclohexyl carboxylate as obtained in Example 5, is dissolved in the minimum quantity of benzene and chromatographed on alumina, elution with a solvent consisting of benzene or a benzene/ether mixture yields 13 - ethyl - 17β - hydroxy-A-nor-5α-gonan-2-one-17β-cyclohexyl carboxylate.

In accordance with the above procedure but starting with any of the mixtures of 13-alkyl-17β-hydroxy-A-nor-5α-gonan-2- and 3-one-17β-acylates produced in Example 5 there is obtained the corresponding 13-alkyl-17β-hydroxy-A-nor-5α-gonan-2-one-17β-acylate.

EXAMPLE 7

2.3 g. of 13-ethyl-17β-acetoxy-A-nor-5α-gonan-2-one are dissolved in 15 ml. of glacial acetic acid with a few drops of hydrobromic acid added thereto. 2.4 g. of a solution of bromine in glacial acetic acid are then added and the mixture allowed to stand for 60 hours at 15° C. Water is added to the mixture and a precipitate given. The precipitate is filtered off, washed, dried, and then recrystallized from 95% ethanol to yield 13-ethyl-17β-acetoxy-1α,3β-dibromo-A-nor-5α-gonan-2-one. In accordance with the above procedure, but starting with the corresponding 13-methyl, 13-n-propyl, 13-n-butyl, 13-isopropyl and 13-isobutyl, 17β-acetoxy-A-nor-5α-gonan-2-one in place of 13-ethyl-17β-acetoxy-A-nor-5α-gonan-2-one, there is obtained the corresponding 13-alkyl-17β-acetoxy-1α,3β-dibromo-A-nor-5α-gonan-2-one.

In accordance with the above procedure but starting with any of the 13-alkyl-17β-hydroxy-A-nor-5α-gonan-17β-acylates produced in Example 6, there is obtained the corresponding 13α - alkyl-17β-acyloxy-1α,3β-dibromo-A-nor-5α-gonan-2-one.

EXAMPLE 8

1.5 g. of 13-ethyl-17β-acetoxy-1α,3β-dibromo-A-nor-5α-gonan-2-one is heated under reflux for 15 minutes in 5 ml. of collidine. The mixture is cooled and extracted with ether and the extract washed with water, dried, the solvent removed by evaporation and the residue recrystallized from ethanol to give 13-ethyl-17β-acetoxy-3-bromo-A-nor-3-gonen-2-one. In accordance with the above procedure, but starting with any of the 13-methyl, 13-n-propyl, 13-n-butyl, 13-isobutyl, and 13-isopropyl-17β-acyloxy - 1α,3β-dibromo-A-nor-5α-gonan-2-ones produced in accordance with Example 7, there is obtained the corresponding 13-alkyl-17β-acyloxy-3-bromo-A-nor-3-gonen-2-one.

EXAMPLE 9

900 milligrams of 13-ethyl-17β-acetoxy-3-bromo-A-nor-3-gonen-2-one are dissolved in 40 ml. of pure xylene and a 18 ml. of a solution of quinoline sulfate in the same solvent together with 3.5 g. of 5% palladium or barium sulfate. The apparatus is flushed out with hydrogen for 20 minutes and thereafter hydrogen is passed into the reaction mixture which is mechanically stirred and heated to reflux for 37 hours. The solvent is removed by evaporation under reduced pressure and the residue filtered on 15 grams of alumina. Elution with petroleum ether and a mixture of ether and petroleum ether yields, on evaporation of the solvent, 13-ethyl-17β-acetoxy-A-nor-3-gonen-2-one.

In accordance with the above procedure, but starting with any of the 13-methyl, 13-n-propyl, 13-n-butyl, 13-isobutyl, 13 - isopropyl - 17β - acetoxy-3-bromo-A-nor-3-gonen-2-ones obtained in accordance with Example 8, there is obtained the corresponding 13-alkyl-17β-acyloxy-A-nor-3-gonen-2-one.

EXAMPLE 10

300 milligrams of 13-ethyl-17β-acetoxy-A-nor-3-gonen-2-one are dissolved in 20 ml. of methanol. 100 milligrams of potassium hydroxide and the mixture heated under reflux in an atmosphere of nitrogen for 1 hour. The solution is concentrated and water added to give a precipitate which is removed by filtration and chromatographed on alumina. Elution with a mixture of petroleum ether and ether yields 13-ethyl-17β-hydroxy-A-nor-3-gonen-2-one.

In accordance with the above procedure but starting with any of the 13-alkyl-17β-acyloxy-A-nor-3-gonen-2-ones prepared in accordance with Example 9, there is obtained the corresponding 13-alkyl-17β-hydroxy-A-nor-3-gonen-2-one.

EXAMPLE 11

20 g. of 13-ethyl-17β-hydroxy-2-oxo-A-nor-3-gonene are dissolved in 600 ml. of xylene in the presence of 600 mg. p-toluene sulfonic acid and 28 ml. of ethylene glycol. The mixture is heated under reflux for 7 days during which time the water/benzene azeotrope is removed in the usual manner and the solvent thus removed and replaced with dry solvent. The mixture is cooled, neutralized with 10% aqueous potassium carbonate, washed with water, and the benzene solution evaporated to yield 13-ethyl-17β-hydroxy-A-nor-3-gonene-2-dioxolane.

In accordance with the above procedure but starting with 13-methyl, 13-n-propyl, 13-isopropyl, 13-n-butyl and 13-isobutyl-17β-hydroxy-2-oxo-A-nor-gonene in place of 13-ethyl-17β-hydroxy-2-oxo-A-nor-gonene, there is obtained the corresponding 13-methyl, 13-n-propyl, 13-isopropyl, 13-n-butyl and 13-isobutyl-17β-hydroxy-A-nor-gonene-2-dioxolane.

EXAMPLE 12

To a suspension of 13 - ethyl-17β-hydroxy-A-nor-3-gonene-2-dioxolane in 100 ml. of pyridine is added a solution of 10 g. of chromium trioxide in dry pyridine. The mixture is stirred for 1 hour and left overnight at 15° C. 10 g. of Celite are added and the mixture filtered under suction. The filtrate is diluted with 1 liter of water; the 13 - ethyl-17-oxo-A-nor-3-gonene-2-dioxolane precipitates and is recovered by filtration.

In accordance with the above procedure but starting with 13-methyl, 13-n-propyl, 13-isopropyl, 13-n-butyl, 13-isobutyl-17β-hydroxy-A-nor-3-gonene-2-dioxolane in place of 13 - ethyl - 17β-hydroxy-A-nor-3-gonene-2-dioxolane, there is obtained the corresponding 13-methyl, 13-n-propyl, 13-isopropyl, 13-n-butyl and 13-isobutyl-17-oxo-A-nor-3-gonene-2-dioxolane.

EXAMPLE 13

To a solution of potassium t-amylate prepared from 15 parts of potassium and 200 parts of t-pentanol are added 500 parts of anhydrous ether. In the course of 30 minutes this solution is stirred, and treated with anhydrous acetylene. Then there are added portionwise 20.4 parts of 17-keto-13-ethyl-A-nor-3-gonen-2-dioxolane in 270 parts of benzene. Drying and passage of acetylene is continued for 6 hours. The reaction mixture is then treated with a saturated aqueous solution of ammonium chloride, washed rapidly and repeatedly with water and the solvents are evaporated. The resulting product is recrystallized repeatedly from ethanol to yield 17α-ethynyl-13-ethyl-17β-hydroxy-A-nor-3-gonene-2-dioxolane.

In accordance with the above procedure but starting with 13-methyl, 13-n-propyl, 13-n-butyl, 13-isopropyl, and 13-isobutyl-17-keto-A-nor-3-gonene-2-dioxolane in place of 13-ethyl-17-keto-A-nor-3-gonene-2-dioxolene there is obtained the corresponding 13-methyl, 13-n-propyl, 13-n-butyl, 13-isopropyl, and 13-isobutyl - 17β - hydroxy-17-ethynyl-A-nor-3-gonene-2-dioxolane.

EXAMPLE 14

To a solution of 16 parts of sodium amide in 280 parts of liquid ammonia is added, with agitation at temperatures of the order of —50° under an atmosphere of nitrogen during 15 minutes, a solution of 22 parts of trans-1,2-dichloroethylene in 35 parts of ether. The resultant mixture is allowed to warm to the boiling point and maintained thereat under reflux with agitation for 1 hour, a solution of approximately 27 parts of 13-ethyl-17-keto-A-nor-3-gonene-2-dioxolane in 105 parts of ether being introduced during the third 15 minutes of the reflux period. Ammonia is allowed to evaporate on standing and to the residue at 5° C.–10° C. are successively added, with agitation, 425 parts of 10% hydrochloric acid and 450 parts of ethyl acetate. Insoluble solids are removed by filtration; and the acetate phase is separated from the filtrate and washed with water and aqueous 10% potassium bicarbonate and dried over anhydrous sodium sulfate, that order. Distillation of solvent yields a mixture of 17α- and 17β-isomers of 13-ethyl-17-chloroethynyl-17-hydroxy-A-nor-3-gonene-2-dioxolane. An analytical sample may be recrystallized from methanol and dried at 150° C. to remove the solvent to give 13-ethyl-17α-chloroethynyl-A-nor-3-gonene-2-dioxolane.

In accordance with the above procedure but starting with 13-methyl, 13-n-propyl, 13-n-butyl, 13-isopropyl, and 13-isobutyl-17-keto-A-nor-3-gonene-2-dioxolane in place of 13-ethyl-17β-hydroxy-A-nor-3-gonen-2-dioxolane there is obtained the corresponding 13-methyl, 13-n-propyl, 13-n-butyl, 13-isopropyl, and 13-isobutyl-17α-chloroethynyl-17β-hydroxy-A-nor-3-gonene-2-dioxolane.

EXAMPLE 15

A solution of 0.5 part of 13-ethyl-17α-ethynyl-17β-hydroxy-A-nor-3-gonene-2-dioxolane in 10 parts of pyridine is hydrogenated with agitation in a hydrogen atmosphere in the presence of Lindlar catalyst until one molecular equivalent of hydrogen has been absorbed. The catalyst is removed by filtration and the filtrate is diluted with water. The 13-ethyl-17α-vinyl-17β-hydroxy - A - nor-3-gonene-2-dioxolane is recrystallized from cyclohexane and dried under high vacuum.

In accordance with the above procedure but starting with 13-methyl, 13-n-propyl, 13-n-butyl, 13-isopropyl, and 13-isobutyl-17α-ethynyl - 17β - hydroxy-A-nor-3-gonene-2-dioxolane in place of 13-ethyl-17α-ethynyl-17β-hydroxy-A-nor-3-gonene-2-dioxolane there is obtained the corresponding 13-methyl, 13-n-propyl, 13-n-butyl, 13-isopropyl, and 13-isobutyl-17α-vinyl - 17β - hydroxy-A-nor-3-gonene-2-dioxolane.

EXAMPLE 16

To a mixture of 4.3 parts of lithium wire and 70 parts of ether, under nitrogen, is added dropwise over a period of about 30 minutes, a solution of 34.25 parts of n-butyl bromide in 35 parts of ether while the temperature is kept at —10° C. This reaction mixture is stirred at 0°–10° C. for about one hour, then filtered under nitrogen to afford 154 parts by volume of an etheral solution of butyl lithium. A mixture of 51 parts by volume of the afore-mentioned ethereal butyl lithium solution with 35 parts of ether is cooled to —10° C., then treated portionwise, over a period of about 30 minutes, with a solution of 6 parts of butyne-1 in 35 parts of ether. The resulting mixture is stirred at 0° C. for about 1½ hours. The cooling bath is removed, and there is then added portionwise to this mixture a solution of 12 parts of 13-ethyl-17-keto-A-nor-3-gonene-2-dioxolane in 100 parts of tetrahydrofuran. After the addition is complete, the solvent is distilled, keeping the volume constant by the addition of tetrahydrofuran. When the temperature of the distillate reaches 55° C., the distillation is stopped, and the mixture is heated at reflux for about 3 hours, then cooled, and poured slowly into ice water. The product which forms is separated by decantation, then dissolved in ether. The ethereal solution is washed successively with water and saturated aqueous sodium chloride, dried over anhydrous sodium sulfate, and concentrated in vacuo to yield a mixture of 17α- and 17β-isomers of 13-ethyl-17-butynyl-17-hydroxy-A-nor-3-gonene-2-dioxolane.

Hydrogenation by the procedure of the preceding example yields a mixture of the 17α- and 17β-isomers of 13-ethyl-17-butenyl-17-hydroxy - A - nor-3-gonene-2-dioxolane.

In accordance with the above procedure but starting with 13-methyl, 13-n-propyl, 13-n-butyl, 13-isopropyl, and 13-isobutyl-17-keto-A-nor-3-gonene-2-dioxolane in place of 13-ethyl-17β-keto-A-nor-3-gonene-2-dioxolane there is obtained the corresponding 13-methyl, 13-n-propyl, 13-n-butyl, 13-isopropyl, and 13-isobutyl-17α-butynyl and 17β-butynyl-A-nor-3-gonene-2-dioxolane.

Similarly hydrogenation by the procedure of the preceding example yields a mixture of the corresponding 17α and 17β butenyl steroids.

EXAMPLE 17

2.84 g. of 13-ethyl-A-nor-3-gonen-17-one-2-dioxolane is reacted in 40 ml. dry tetrahydrofuran with a Grignard reagent prepared from 17 g. trifluorobromoethylene and 2.95 g. magnesium (in 30 ml. of tetrahydrofuran). The reaction is performed at −20° C. and the product was subsequently allowed to react for 3 hours at room temperature. It is worked up by pouring into a mixture of ice and ammonium chloride and after extraction with ether, the concentrated organic phase yields 3 g. of a foamy product. This is hydrolyzed by stirring for 3 hours in a solution of 200 ml. methanol, containing 6 ml. of concentrated hydrochloric acid.

The isolated 13-ethyl-17α-trifluorovinyl-17β-hydroxy-A-nor-3-gonene-2-dioxolane may be purified by column chromatography on acid washed alumina.

In accordance with the above procedure but starting with 13-methyl, 13-n-propyl, 13-n-butyl, 13-isopropyl, and 13-isobutyl-A-nor-3-gonen-17-one-2-dioxolane in place of 13-ethyl-A-nor-3-gonen-17-one - 2 - dioxolane there is obtained the corresponding 13-methyl, 13-n-propyl, 13-n-butyl, 13-isopropyl, and 13-isobutyl - 17α - trifluorovinyl-17β-hydroxy-A-nor-3-gonene-2-dioxolane.

EXAMPLE 18

A mixture of 3 parts of 13 - ethyl-17-ethynyl-17-hydroxy-A-nor-3-gonene-2-dioxolane is dissolved in 100 parts of methanol and 6 parts of a solution prepared by dissolving 8 parts of sulfuric acid in 100 parts of water, is heated under reflux for one hour and concentrated in vacuo. The concentrate is extracted with ethyl acetate and the extract washed with aqueous sodium bicarbonate, saturated aqueous sodium chloride and water. The extract is dried over magnesium sulfate, filtered, and the filtrate evaporated to dryness under reduced pressure, to give 13-ethyl-17-ethynyl-17-hydroxy-A-nor-3-gonen-2-one. In accordance with the above procedure but starting with 13-methyl, 13-n-propyl, 13-n-butyl, 13-isopropyl, and 13-isobutyl-17-ethynyl-17-hydroxy-A-nor-5α-gonane-2-dioxolane in place of 13-ethyl-17-ethynyl-17-hydroxy-A-nor - 3 - gonene-2-dioxolane, there is obtained the corresponding 13-methyl, 13-n-propyl, 13-n-butyl, 13-isopropyl and 13-isobutyl-17-ethynyl-17-hydroxy-A-nor-3-gonen-2-one.

EXAMPLE 19

A mixture of 3 parts of 13-ethyl-17-chloroethynyl-17-hydroxy-A-nor-3-gonene-2-dioxolane is dissolved in 100 parts of methanol and 6 parts of a solution prepared by dissolving 8 parts of sulfuric acid in 100 parts of water, is heated under reflux for one hour and concentrated in vacuo. The concentrate is extracted with ethyl acetate and the extract washed with aqueous sodium bicarbonate, saturated aqueous sodium chloride and water. The extract is dried over magnesium sulfate, filtered, and the filtrate evaporated to dryness under reduced pressure, to give 13-ethyl-17-chloroethynyl-17-hydroxy-A-nor - 3 - gonen-2-one. In accordance with the above procedure but starting with 13-methyl, 13-n-propyl, 13-n-butyl, 13-isopropyl, and 13-isobutyl-17-chloroethynyl - 17 - hydroxy - A - nor-3-gonene-2-dioxolane in place of 13-ethyl-17-chloroethynyl-17-hydroxy-A-nor-3-gonane-2-dioxolane, there is obtained the corresponding 13-methyl, 13-n-propyl, 13-n-butyl, 13-isopropyl and 13-isobutyl-17-chloroethynyl - 17 - hydroxy-A-nor-3-gonen-2-one.

EXAMPLE 20

A mixture of 3 parts of 13-ethyl-17-vinyl-17-hydroxy-A-nor-3-gonene-2-dioxolane is dissolved in 100 parts of methanol and 6 parts of a solution prepared by dissolving 8 parts of sulfuric acid in 100 parts of water, is heated under reflux for one hour and concentrated in vacuo. The concentrate is extracted with ethyl acetate and the extract washed with aqueous sodium bicarbonate, saturated aqueous sodium chloride and water. The extract is dried over magnesium sulfate, filtered, and the filtrate evaporated to dryness under reduced pressure, to give 13-ethyl-17-vinyl-17-hydroxy-A-nor-3-gonen-2-one. In accordance with the above procedure but starting with 13-methyl, 13-n-propyl, 13-n-butyl, 13-isopropyl, and 13-isobutyl-17-vinyl-17-hydroxy-A-nor-3-gonene-2-dioxolane in place of 13-ethyl-17-vinyl-17-hydroxy-A-nor-3-gonene-2-dioxolane, there is obtained the corresponding 13-methyl, 13-n-propyl, 13-n-butyl, 13-isopropyl and 13-isobutyl-17-vinyl-17-hydroxy-A-nor-3-gonen-2-one.

EXAMPLE 21

A mixture of 3 parts of 13-ethyl-17-butynyl-17-hydroxy-A-nor-3-gonene-2-dioxolane is dissolved in 100 parts of methanol and 6 parts of a solution prepared by dissolving 8 parts of sulfuric acid in 100 parts of water, is heated under reflux for one hour and concentrated in vacuo. The concentrate is extracted with ethyl acetate and the extract washed with aqueous sodium bicarbonate, saturated aqueous sodium chloride and water. The extract is dried over magnesium sulfate, filtered, and the filtrate evaporated to dryness under reduced pressure, to give 13-ethyl-17-butynyl-17-hydroxy-A-nor-3-gonen-2-one. In accordance with the above procedure but starting with 13-methyl, 13-n-propyl, 13-n-butyl, 13-isopropyl, and 13-isobutyl-17-butynyl-17-hydroxy-A-nor-3-gonene-2-dioxolane in place of 13-ethyl-17-butynyl-17-hydroxy-A-nor - 5α - gonane-2-dioxolane, there is obtained the corresponding 13-methyl, 13-n-propyl, 13-n-butyl, 13-isopropyl and 13-isobutyl-17-butynyl-17-hydroxy-A-nor-3-gonen-2-one.

In accordance with the above procedure but starting with the 17-butynyl or 17-butyl analogs of the aforementioned 17-butynyl steroids, there are obtained the corresponding 13-alkyl-17-butenyl or 17-butyl-A-nor-3-gonen-2-ones.

EXAMPLE 22

A mixture of 3 parts of 13-ethyl-17-trifluoromethyl-vinyl-17-hydroxy-A-nor-3-gonene-2-dioxolane is dissolved in 100 parts of methanol and 6 parts of a solution prepared by dissolving 8 parts of sulfuric acid in 100 parts of water, is heated under reflux for one hour and concentrated in vacuo. The concentrate is extracted with ethyl acetate and the extract washed with aqueous sodium bicarbonate, saturated aqueous sodium chloride and water. The extract is dried over magnesium sulfate, filtered, and the filtrate evaporated to dryness under reduced pressure, to give 13-ethyl-17-trifluoromethylvinyl-17-hydroxy-A-nor-3-gonen-2-one. In accordance with the above procedure but starting with 13-methyl, 13-n-propyl, 13-n-butyl, 13-isopropyl, and 13-isobutyl-17-trifluoromethylvinyl-17-hydroxy-A-nor-3-gonene-2 - dioxolane in place of 13-ethyl-17-trifluoromethylvinyl-17-hydroxy-A-nor-3-gonene-2-dioxolane, there is obtained the corresponding 13-methyl, 13-n-propyl, 13-n-butyl, 13-isopropyl, and 13-isobutyl-17-trifluoromethylvinyl-17-hydroxy - A-nor-3-gonen-2-one.

In accordance with the above procedure but starting with the 17-trifluoromethylethynyl steriods in place of the 17-trifluoromethylvinyl steroid, there are obtained the corresponding 13-alkyl-17-trifluoromethylethynyl-17-hydroxy-A-nor-3-gonen-2-ones.

EXAMPLE 23

9 g. of 13-ethyl-17-oxo-A-nor-3-gonen-2-dioxolane is added to a freshly prepared solution of potassium t-butoxide (21 g. of potassium in 90 ml. of t-butanol). The suspension is stirred at room temperature in an atmosphere of nitrogen and 8 ml. of freshly distilled isoamyl nitrite is added dropwise. The mixture is allowed to stand overnight at a temperature of 15° C. and diluted with water. The aqueous mixture is extracted with ether and acidified with acetic acid. 13-ethyl-16-oximino-17-oxo-A-nor-gonene-2-dioxolane is precipitated and is isolated by filtration.

The 16-oximino compound prepared as above is dissolved in 200 ml. of acetic acid and 16 ml. of water, 24 g. of powdered metallic zinc is added slowly. A further 120 ml. of water are then added and the mixture heated under reflux for 2 hours. The solution is concentrated under reduced pressure until most of the acetic acid is removed, and the residue taken up in water from which the product, 13-ethyl-2,16-dioxo-17-hydroxy-A-nor-3-gonene crystallizes.

In accordance with the above procedure but starting with 13-methyl, 13-n-propyl, 13-n-isopropyl, 13-n-butyl, and 13-isobutyl-17β-hydroxy-A-nor-3-gonene-2-dioxolane in place of 13-ethyl-17β-hydroxy-A-non-3-gonene-2-dioxolane there is obtained the corresponding 13-methyl, 13-n-propyl, 13-isopropyl, 13-n-butyl, and 13-isobutyl-2,16-dioxo-17β-hydroxy-A-nor-3-gonene.

EXAMPLE 24

5.6 g. of 13-ethyl-2,16-dioxo-17-hydroxy-A-nor-3-gonene is dissolved in 100 ml. of pyridine and 16.5 of p-toluene sulfonyl chloride is added in a dry atmosphere. The mixture is allowed to stand for 8 hours at 15° C. Water is added with cooling and 13-ethyl-2,16-dioxo-17-tosyloxy-A-nor-3-gonene is obtained as a precipitate.

In accordance with the above procedure but starting with 13-methyl, 13-n-propyl, 13-n-isopropyl, 13-n-butyl, 13 - isobutyl - 2,16 - dioxo - 17 - hydroxy - A - nor - 3-gonene in place of 13-ethyl-2,16-dioxo-17-hydroxy-A-nor-3-gonene there is obtained the corresponding 13-methyl, 13-n-propyl, 13-isopropyl, 13-n-butyl, 13-isobutyl-2,16-dioxo-17-tosyloxy-A-nor-3-gonene.

In accordance with the above procedure and using any of the aforementioned steriods but using methane sulfonyl chloride in place of p-toluene sulfonyl chloride there is obtained the corresponding 17-mesyloxy steroid.

EXAMPLE 25

6.9 g. of 13-ethyl-2,16-dioxo-17-tosyloxy-A-nor-3-gonene is dissolved in 90 ml. of isopropanol and 25 ml. of pyridine and 3 g. of potassium borohydride is added in small amounts with stirring. The mixture is stirred for a further 2 hours and then treated with a slurry of 35 ml. of concentrated hydrochloric acid and ice. The mixture is extracted with ether, the ether layer washed with dilute hydrochloric acid and water and the solvent removed by evaporation under reduced pressure.

The residue is dissolved in 100 ml. of ethanol, the solution heated to reflux and 150 ml. of 1 N sodium hydroxide added and heating continued for a further hour. 50 ml. of alcohol is distilled off, and water added. On cooling 13-ethyl-2-hydroxy-16-oxo-A-nor-3-gonene is obtained as a precipitate.

In accordance with the above procedure but starting with 13-methyl, 13-n-propyl, 13-n-isopropyl, 13-n-butyl, and 13 - isobutyl - 2,16 - dioxo - 17 - tosyloxy - A - nor-3-gonene in place of 13-ethyl-2,16-dioxo-17-tosyloxy-A-nor-3-gonene there is obtained the corresponding 13-methyl, 13-n-propyl, 13-isopropyl, 13-n-butyl, and 13-isobutyl-2-hydroxy-16-oxo-A-nor-3-gonene.

EXAMPLE 26

To a solution of potassium t-amylate prepared from 15 parts of potassium and 200 parts of t-pentanol are added 500 parts of anhydrous ether. In the course of 30 minutes this solution is stirred, and treated with anhydrous acetylene. Then there are added portionwise 20.4 parts of 2-hydroxy-A-nor-13-ethyl-3-gonen-16-one in 270 parts of benzene. Drying and passage of acetylene is continued for 6 hours. The reaction mixture is then treated with a saturated solution of ammonium chloride, washed rapidly and repeatedly with water and the solvents are evaporated. The resulting crude product is recrystallized repeatedly from ethanol to yield 16-ethynyl-13-ethyl-2,16-dihydroxy-A-nor-3-gonene.

In accordance with the above procedure but starting with 13-methyl, 13-n-propyl, 13-n-butyl, 13-isopropyl, and 13 - isobutyl - 2 - hydroxy - A - nor - 3 - gonen - 16 - one in place of 13-ethyl-2-hydroxyl-A-nor-3-gonen-16-one there is obtained the corresponding 13-methyl, 13-n-propyl, 13-n-butyl, 13-isopropyl, and 13-isobutyl-2,16-hydroxy-16-ethynyl-A-nor-3-gonene.

EXAMPLE 27

A mixture of 10 parts of the ethynylation product of the preceding example, 55 parts of acetic anhydride and 50 parts of pyridine is heated at reflux for an hour and after standing for 8 hours, washed with water and dried. On crystallization from 200 parts of ethanol one collects 13-ethyl-2,16-diacetoxy-16-ethynyl-A-nor-3-gonene.

By evaporation of the mother liquors there is obtained a mixture of diacetates which is chromatographed over an alumina column. During the beginning of the development of the column with benzene one obtains, after evaporation of the eluate and recrystallization from ethanol, 2,16-diacetoxy-16β-ethynyl-13-ethyl - A - nor-3-gonene.

In accordance with the above procedure but starting with 13-methyl, 13-n-propyl, 13-n-butyl, 13-isopropyl, and 13-isobutyl-2,16-dihydroxy-16β-ethynyl-A-nor-3-gonane in place of 13-ethyl-2,16-dihydroxy-16α- or 16β-ethynyl-A-nor-3-gonane there is obtained the corresponding 13-methyl, 13-n-propyl, 13-n-butyl, 13-isopropyl, and 13-isobutyl-2,16-diacetoxy-16α- or 16β-ethynyl - A - nor-3-gonene.

In accordance with the above procedure and using any of the aforementioned steroids of the gonane except that there is used propionyl, butyryl, valeryl, or benzyl anhydride, in place of acetic anhydride, there is obtained the corresponding 13-alkyl-2,16-diacyloxy-16α- or 16β-ethynyl-A-nor-3-gonene.

EXAMPLE 28

Saponification of 3 parts of 2,16-diacetoxy-16β-ethynyl-13-ethyl-A-nor-3-gonene, by heating at reflux for an hour in 80 parts of ethanol containing 10 parts of 10 N sodium hydroxide is followed by washing with water and drying. Recrystallization from aqueous ethanol yields 16β-ethynyl-13-ethyl-A-nor-3-gonene-2,16-diol.

In accordance with the above procedure but starting with 13-methyl, 13-n-propyl, 13-n-butyl, 13-isopropyl, and 13-isobutyl-2,16-diacetoxy-16β-ethynyl - A - nor-3-gonene in place of 13-ethyl-2,16-diacetoxy-16β-ethynyl-A-nor-3-gonene there is obtained the corresponding 13- methyl, 13-n-propyl, 13-n-butyl, 13-isopropyl, and 13-isobutyl-16β-ethynyl-A-nor-3-gonene-2,16-diol.

In accordance with the above procedure and using any of the aforementioned steroids of the gonane series except that the substituents at the 2 and the 16 positions are propionoxy, butyroxy, valeroxy, or benzyloxy in place of acetoxy, there is obtained the corresponding 13-alkyl-16β-ethynyl-A-nor-3-gonene-2,16β-diol.

EXAMPLE 29

A solution of 1 part of the ethynylation product of Example 26 consisting of a mixture of the isomeric 16-ethynyl-13-ethyl-A-nor-3-gonene-2,16-diol, in 10 parts of pyridine is oxidized with 1 part of chromic oxide dissolved in 10 parts of pyridine. After 10 hours of standing the reaction mixture is treated with two parts of 2-propanol and 1 part of infusorial earth. The precipitate is removed on a filter and washed with hot dioxane and the filtrate is diluted with much water. The precipitate is collected and the mother liquors are extracted with ether. The combined product is subjected to chromatography over alumina. The column is developed with benzene and then a mixture of benzene and 10% ether to yield 13-ethyl-16α-ethynyl-16β-hydroxy-A - nor - 3 - gonen-2-one which may be recrystallized from aqueous methanol.

In the foregoing chromatography one obtains on further elution with a 50% solution of ether in benzene 16β - ethynyl-16α-hydroxy-13-ethyl-A-nor-3-gonen-2-one which may be recrystallized from aqueous methanol.

In accordance with the above procedure but starting with 13-methyl, 13-n-propyl, 13-n-butyl, 13-isopropyl, and 13-isobutyl-16-ethynyl-A-nor-3-gonene-2,16-diols in place of 13-ethyl-16-ethynyl-A-nor-3-gonene-2,16 - diols there are obtained the corresponding 13-methyl, 13-n-propyl, 13-n-butyl, 13-isopropyl, and 13-isobutyl-16α-ethynyl-16β-hydroxy-A-nor-3-gonen-2-one, and the 16β-ethynyl-16α-hydroxy-A-nor-3-gonen-2-one.

EXAMPLE 30

To a solution of 16 parts of sodium amide in 280 parts of liquid ammonia is added, with agitation at temperatures of the order of −50° C. under an atmosphere of nitrogen during 15 minutes, a solution of 22 parts of trans-1,2-dichloroethylene in 35 parts of ether. The resultant mixture is allowed to warm to the boiling point and maintained thereat under reflux with agitation for 1 hour, a solution of approximately 27 parts of 2-hydroxy-13-ethyl-A-nor-3-gonen-16-one in 105 parts of ether being introduced during the third 15 minutes of the reflux period. Ammonia is allowed to evaporate on standing and to the residue at 5°–10° C. are successively added, with agitation, 425 parts of 10% hydrochloric acid and 450 parts of ethyl acetate. Insoluble solids are removed by filtration; and the acetate phase is separated from the filtrate and washed with water and aqueous 10% potassium bicarbonate and dried over anhydrous sodium sulfate, in that order. Distillation of solvent yields a mixture of 16α- and 16β-isomers of 16-chloroethynyl-13-ethyl-A-nor-3-gonene-2,16-diol. An analytical sample may be recrystallized from methanol and dried at 150° to remove the solvent to give 16α-chloroethynyl-13-ethyl-A-nor-3-gonene-2,16-diol.

In accordance with the above procedure but starting with 13-methyl, 13-n-propyl, 13-n-butyl, 13-isopropyl, and 13-isobutyl-2-hydroxy-A-nor-3-gonen-16-one in place of 13-ethyl-2-hydroxy-A-nor-3-gonen-16-one there is obtained the corresponding 13-methyl, 13-n-propyl, 13-n-butyl, 13-isopropyl, and 13-isobutyl-16α-chloroethynyl-A-nor-3-gonene-2,16-diol.

EXAMPLE 31

A solution of 0.5 part of 16α-ethynyl-A-nor-13-ethyl-3-gonene-2,16-diol in 10 parts of pyridine is hydrogenated with agitation in a hydrogen atmosphere in the presence of Lindlar catalyst until one molecular equivalent of hydrogen has been absorbed. The catalyst is removed by filtration and the filtrate is diluted with water. The 16α-vinyl-A-nor-13-ethyl-3-gonene-2β,16β-diol is recrystallized from cyclohexane and dried under high vacuum.

In accordance with the above procedure but starting with 13-methyl, 13-n-propyl, 13-n-butyl, 13-isopropyl, and 13-isobutyl-16α-ethynyl-A-nor-3-gonene-2β,16β-diol in place of 13-ethyl-16α-ethynyl-A-nor-3-gonene-2β,16β-diol there is obtained the corresponding 13-methyl, 13-n-propyl, 13-n-butyl, 13-isopropyl, and 13-isobutyl-16α-vinyl-A-nor-3-gonane-2β,16β-diol.

EXAMPLE 32

To a mixture of 4.3 parts of lithium wire and 70 parts of ether, under nitrogen, is added dropwise over a period of about 30 minutes, a solution of 34.25 parts of n-butyl bromide in 35 parts of ether while the temperature is kept at −10° C. This reaction mixture is stirred at 0°–10° C. for about one hour, then filtered under nitrogen to afford 154 parts by volume of an ethereal solution of butyl lithium. A mixture of 51 parts by volume of the aforementioned ethereal butyl lithium solution with 35 parts of ether is cooled to −10°, then treated portionwise, over a period of about 30 minutes, with a solution of 6 parts of butyne-1 in 35 parts of ether. The resulting mixture is stirred at 0° for about 1½ hours. The cooling bath is removed, and there is then added portionwise to this mixture a solution of 12 parts of 2β-hydroxy-13-ethyl-A-nor-3-gonen-16-one in 100 parts of tetrahydrofuran. After the addition is complete, the solvent is distilled, keeping the volume constant by the addition of tetrahydrofuran. When the temperature of the distillate reaches 55°, the distillation is stopped, and the mixture is heated at reflux for about 3 hours, then cooled, and poured slowly into ice water. The product which forms is separated by decantation, then dissolved in ether. The ethereal solution is washed successively with water and saturated aqueous sodium chloride, dried over anhydrous sodium sulfate, and concentrated in vacuo to yield a mixture of 16α- and 16β-isomers of 16-butynyl-13-ethyl-A-nor-3-gonene-2,16-diol.

Hydrogenation by the procedure of the preceding example yields a mixture of the 16α- and 16β-isomers of 16-butenyl-13-ethyl-A-nor-3-gonene-2,16-diol.

In accordance with the above procedure but starting with 13-methyl, 13-n-propyl, 13-n-butyl, 13-isopropyl, and 13-isobutyl-2β-hydroxy-A-nor-3-gonen-16-one in place of 13-ethyl-2β-hydroxy-A-nor-3-gonen-16-one there is obtained the corresponding 13-methyl, 13-n-propyl, 13-n-butyl, 13-isopropyl, and 13-isobutyl-16α-butynyl and 16β-butynyl-A-nor-3-gonene-2,16-diols.

Similarly hydrogenation by the procedure of the preceding example yields a mixture of the corresponding 16α and 16β butenyl steroids.

EXAMPLE 33

1 g. of 13-ethyl-A-nor-3-gonen-2β-ol-16-one is reacted with 5 ml. of a commercial 3-molar solution of methyl magnesium bromide by refluxing for 12 hours in benzene solution. The reaction product is poured into a mixture of ice and ammonium chloride, and the steroid isolated by ether extraction.

The obtained product is oxidized with 1 g. chromium trioxide in pyridine solution, allowed to react at room temperature overnight and isolated by distribution between ethyl acetate and excess water. The isolated crude product is purified by chromatography on acid-washed alumina. The fractions eluted with 10–30% ether in benzene, yields after crystallization 13-ethyl-16α-methyl-16β-hydroxy-A-nor-3-gonen-2-one.

In accordance with the above procedure but starting with 13-methyl, 13-n-propyl, 13-n-butyl, 13-isopropyl, and 13-isobutyl-2β-hydroxy-A-nor-3-gonen-16-one in place of 13-ethyl-2β-hydroxy-A-nor-3-gonen-16-one there is obtained the corresponding 13-methyl, 13-n-propyl, 13-n-butyl, 13-isopropyl, and 13-isobutyl-16-α-methyl-A-nor-3-gonene-2,16-diol.

In accordance with the above procedure and using any of the aforementioned steroids of the gonane series except that there is used cyclohexyl, propyl, butyl, pentyl, phenyl and benzyl, lithium or magnesium bromide or iodide in place of methyl lithium or methyl magnesium bromide, there is obtained the corresponding 13-alkyl-16α-methyl-A-nor-3-gonene-2,16-diol.

EXAMPLE 34

2.84 g. of 13-ethyl-2β-hydroxy-A-nor-3-gonen-16-one is reacted in 40 ml. dry tetrahydrofuran with a Grignard reagent prepared from 17 g. trifluorobromoethylene and 2.95 g. magnesium (in 30 ml. of tetrahydrofuran). The reaction is performed at −20° C. and the product was subsequently allowed to react for 3 hours at room temperature. It was worked up by pouring into a mixture of ice and ammonium chloride and after extraction with ether, the concentrated organic phase yields 13-ethyl-16-trifluorovinyl-A-nor-3-gonene-2,16-diol which may be purified by volumn chromatography on acid-washed alumina.

The obtained product is oxidized with 1 g. chromium trioxide in pyridine solution, allowed to react at room temperature overnight and isolated by distribution between ethyl acetate and excess water. The isolated crude product is purified by chromatography on acid-washed alumina. The fractions eluted with 10–30% ether in benzene, yields after crystallization 13-ethyl-16-trifluorovinyl-16-hydroxy-A-nor-3-gonen-2-one.

In accordance with the above procedure but starting with 13-methyl, 13-n-propyl, 13-n-butyl, 13-isopropyl, and 13-isobutyl-2β-hydroxy-A-nor-3-gonen-16-one in place of 13-ethyl-2β-hydroxy-A-nor-3-gonen-16-one there is obtained the corresponding 13-methyl, 13-n-propyl, 13-n-butyl, 13-isopropyl, and 13-isobutyl-16-trifluorovinyl-16-hydroxy-A-nor-3-gonene-2-one.

In accordance with the above procedure and using any of the aforementioned steroids of the gonane series except that trifluoromethylvinyl or trifluoromethylethynyl magnesium bromide is used in place of trifluorovinyl magnesium bromide there is obtained the corresponding 13 - alkyl - 16-hydroxy-16-halohydrocarbon-A-nor-3-gonene-2-one.

In accordance with the procedure of Examples 2–34, but starting with the corresponding 13-substituted-10-methyl steroid in place of the 13-substituted-10-desmethyl steroid the corresponding 13-substituted-10-methyl steroid is obtained.

What is claimed is:
1. A 13β - lower alkyl-17-ethynyl-17-hydroxy-A-nor-3-gonene-2-one.
2. A 13β - lower alkyl-17-(trifluorovinyl-17-hydroxy-A-nor-3-gonene-2-one.
3. 13β-ethyl-17-ethynyl-17-hydroxy - A - nor-3-gonen-2-one.
4. 13β-ethyl-17-trifluorovinyl - 17 - hydroxy-A-nor-3-gonene-2-one.
5. 13β-ethyl-17-chloroethynyl - 17 - hydroxy-A-nor-3-gonene-2-one.
6. 13β-ethyl-17-trifluoromethylethynyl - 17 - hydroxy A-nor-3-gonene-2-one.

References Cited

UNITED STATES PATENTS 3,210,406  10/1965  Weisenborn.

OTHER REFERENCES

Djerassi et al.: J. Am. Chem. Soc., Vol. 76, pp. 4092–4094 (1954).

Fried et al.: J. Am. Chem. Soc., Vol. 83, pp. 4663–4664 (1961).

Raphael: Adv. in Org. Chem., Vol. 3, pp. 262–264 (1963).

LEON ZITVER, *Primary Examiner.*

M. JACOB, *Assistant Examiner.*

U.S. Cl. X.R.

260—340.9, 397.4, 456, 468, 476, 488, 617; 424—331